US012526295B2

(12) United States Patent
Jones

(10) Patent No.: US 12,526,295 B2
(45) Date of Patent: Jan. 13, 2026

(54) THREAT MANAGEMENT USING NETWORK TRAFFIC TO DETERMINE SECURITY STATES

(71) Applicant: SOPHOS LIMITED, Abingdon Oxfordshire (GB)

(72) Inventor: Craig Robert Jones, Wales (GB)

(73) Assignee: SOPHOS LIMITED, Abingdon (GB)

( * ) Notice: Subject to any disclaimer, the term of this patent is extended or adjusted under 35 U.S.C. 154(b) by 442 days.

(21) Appl. No.: 17/546,196

(22) Filed: Dec. 9, 2021

(65) Prior Publication Data

US 2022/0385683 A1 Dec. 1, 2022

Related U.S. Application Data

(60) Provisional application No. 63/194,453, filed on May 28, 2021.

(51) Int. Cl.
H04L 9/40 (2022.01)

(52) U.S. Cl.
CPC ...... H04L 63/1425 (2013.01); H04L 63/1416 (2013.01); H04L 63/1433 (2013.01); H04L 63/1441 (2013.01); H04L 63/205 (2013.01)

(58) Field of Classification Search
None
See application file for complete search history.

(56) References Cited

U.S. PATENT DOCUMENTS

| | | | | |
|---|---|---|---|---|
| 9,722,895 | B1* | 8/2017 | Sarukkai | H04L 67/10 |
| 10,068,089 | B1* | 9/2018 | Shavell | H04W 12/12 |
| 11,720,686 | B1* | 8/2023 | Cross | G06F 9/455 |
| | | | | 726/25 |
| 11,777,976 | B2* | 10/2023 | Boyer | H04L 67/53 |
| | | | | 726/25 |
| 11,777,984 | B1* | 10/2023 | Prayaga | H04L 63/1441 |
| | | | | 726/23 |
| 11,853,181 | B2* | 12/2023 | Hicks | G06F 11/079 |
| 2013/0298192 | A1* | 11/2013 | Kumar | H04L 63/1425 |
| | | | | 726/25 |
| 2016/0127417 | A1* | 5/2016 | Janssen | H04L 63/1433 |
| | | | | 726/1 |
| 2017/0289179 | A1* | 10/2017 | Dubuc | G06F 21/51 |
| 2018/0091540 | A1* | 3/2018 | Solow | H04L 63/1433 |
| 2018/0124114 | A1* | 5/2018 | Woods | G06F 21/577 |
| 2019/0188389 | A1* | 6/2019 | Peled | H04L 63/20 |
| 2020/0077265 | A1* | 3/2020 | Singh | H04L 63/0272 |
| 2020/0153855 | A1* | 5/2020 | Kirti | H04L 63/20 |
| 2020/0285761 | A1* | 9/2020 | Buck | G06F 21/51 |
| 2021/0144168 | A1* | 5/2021 | Vester | G06F 9/451 |
| 2021/0367966 | A1* | 11/2021 | Yanay | H04L 63/0823 |
| 2022/0053011 | A1* | 2/2022 | Rao | G06F 21/577 |
| 2022/0103592 | A1* | 3/2022 | Semel | H04L 63/20 |

(Continued)

Primary Examiner — Rupal Dharia
Assistant Examiner — Shadi H Kobrosli
(74) Attorney, Agent, or Firm — IP Spring

(57) ABSTRACT

Various aspects related to methods, systems, and computer readable media for using network traffic to determine security states on an enterprise network. Network traffic may be monitored and scrutinized to identify potential security threats. The potential security threats may be ranked and presented to a network administrator for further examination of each endpoint, or, automatic remedial actions may be taken based on a security status score of each endpoint.

20 Claims, 9 Drawing Sheets

(56) References Cited

U.S. PATENT DOCUMENTS

| 2023/0007028 A1* | 1/2023 | Weingarten | H04L 67/34 |
| 2023/0291715 A1* | 9/2023 | Barnett | H04L 63/0236 |
| 2023/0308474 A1* | 9/2023 | Thompson | H04L 63/1433 |

* cited by examiner

| | Network Activity Management 602 | | | | | | | |
|---|---|---|---|---|---|---|---|---|
| Time ←604 | Subtype ←606 | Source IP ←608 | Dest IP ←610 | Category ←612 | URL ←614 | TX Size ←616 | RX Size ←618 | Action ←620 |
| Timestamp | Allowed | 100.0.0.5 | 50.4.0.0 | Information Technology | www.~~.us | 125kB | 256MB | ⌐ Additional ¬ Info ⌐ Disable ¬ Endpoint ⌐ Quarantine ¬ Endpoint |

| Endpoint | Source IP | Security Vendor | Security Status | Last Update | Other | Action |
|---|---|---|---|---|---|---|
| Endpoint ID (Rank 1) | 100.0.0.5 | Security Vendor | Active | 125kB | Other | Quarantine Endpoint |
| Endpoint ID (Rank 2) | 130.50.10.5 | Security Vendor | Active | 256kB | Other | Additional Info / Disable Endpoint / Quarantine Endpoint |
| ... | ... | ... | ... | ... | ... | ... |
| Endpoint ID (Rank N) | 101 19.0.5 | Security Vendor | Active | 256kB | Other | Additional Info |

Network Security Management 648

FIG. 6B

THREAT MANAGEMENT USING NETWORK TRAFFIC TO DETERMINE SECURITY STATES

CROSS-REFERENCE TO RELATED APPLICATIONS

This application claims the benefit of priority to U.S. Provisional Application Serial No. 63/194,453, filed on May 28, 2021, entitled "THREAT MANAGEMENT USING NETWORK TRAFFIC TO DETERMINE SECURITY STATES," the entire contents of which are hereby incorporated by reference herein.

TECHNICAL FIELD

Embodiments relate generally to threat management in a computer network, and more particularly, to methods, systems, and computer readable media that assess network security in a computer network with a plurality of endpoints based on network traffic.

BACKGROUND

With continually evolving computer security threats and large numbers of personal devices being used on enterprise networks, e.g., that support bring-your-own-device (BYOD) policy, network security is an important problem. It is important to identify security threats to computer networks, and to prioritize disposal of potential threats to the network and network endpoints.

SUMMARY

Implementations of this application relate to methods, systems, and computer readable media for using network traffic to determine security states.

In some implementations, a computer-implemented method comprises: monitoring, by a server, network traffic on a computer network that includes a plurality of endpoints, wherein the network traffic for each endpoint includes sent data that is transmitted from the endpoint and received data that is received by the endpoint over the computer network; for at least some of the endpoints, identifying a plurality of destination addresses from the sent data and a plurality of source addresses from the received data; and determining a security status score for the endpoint based on a comparison of the plurality of destination addresses and the plurality of source addresses with a set of known security addresses associated with one or more trusted security product vendors; generating a ranked list of the plurality of endpoints based on the security status scores; displaying the ranked list of the at least some of the endpoints based on the security status scores.

In some implementations, the network traffic is encrypted, the destination addresses are Internet Protocol (IP) addresses, and monitoring network traffic comprises: passively monitoring the network traffic to determine destination Internet Protocol (IP) addresses that are associated with the endpoints without decrypting the network traffic.

In some implementations, determining the security status score comprises: correlating the destination IP addresses with the set of known security addresses; and adjusting the security status score based on the correlating such that endpoints with destination IP addresses that have a first correlation to the set of known security addresses are assigned higher security status scores than endpoints that have a second correlation less than the first correlation.

In some implementations, the received data includes a plurality of data items, the method further comprising: determining a size of each of the plurality of data items; and wherein determining the security status score comprises assigning a lower score for endpoints associated with received data items that have a size different than a known size of security product patches, and assigning a higher score for endpoints associated with received data items that have a size similar to the known size of security product patches.

In some implementations, the method further comprises: directing one or more endpoints of the plurality of endpoints to install a current version of security products from the trusted security product vendors; and building the set of known security addresses based on network traffic of the one or more endpoints with the current version of security products.

In some implementations, the determining the security status score comprises one or more of: determining that the endpoint has received data that matches known security patches from the known security addresses; determining that a report of security software was received from the endpoint and the endpoint has received data from the known security addresses; or determining that the endpoint has deviated from an established pattern of network traffic behavior with the set of known security addresses.

In some implementations, generating the ranked list of the plurality of endpoints comprises: ordering the one or more of the endpoints in the ranked list based on the security status score.

In some implementations, the method further comprises providing a user interface that includes the ranked list, wherein one or more endpoints within the ranked list that have a security status score that meets a score threshold are highlighted in the user interface.

In some implementations, the ranked list identifies security compromised endpoints that do not have active security software installed thereon.

In some implementations, the method further comprises: receiving a selection of a disposition for one or more selected endpoints of the prioritized list; and performing the selected disposition.

According to another aspect, a non-transitory computer-readable medium with instructions stored thereon that, responsive to execution by a processing device, causes the processing device to perform operations comprising: monitoring network traffic on a computer network that includes a plurality of endpoints, wherein the network traffic for a given endpoint includes sent data that is transmitted from the endpoint and received data that is received by the endpoint over the computer network; for each given endpoint, determining a security status score for the given endpoint based on a comparison of the sent data and the received data with network traffic associated with one or more trusted security product vendors; and generating a ranked list of endpoints based on the respective security status score for each endpoint in the list.

In some implementations, the network traffic is encrypted, and monitoring network traffic comprises: passively monitoring the network traffic to determine destination addresses that are associated with the endpoints without decrypting the network traffic.

In some implementations, determining the security status score comprises: correlating the sent data with a set of known security addresses; and adjusting the security status score based on the correlating such that endpoints correlated to the set of known security addresses have higher security status scores than endpoints lacking correlation.

In some implementations, the received data includes a plurality of data items, and the operations further comprise: determining a size of each of the plurality of data items; and reducing the security status score for an endpoint with data items that have a size different than a known size of security product patches.

In some implementations, the operations further comprise: directing one or more endpoints of the plurality of endpoints to install a latest version of security products from the trusted security product vendors; and building the set of known security addresses based on network traffic of the one or more endpoints.

In some implementations, the determining the security status score comprises one or more of: determining that the endpoint has received data from the one or more trusted security product vendors that matches known security patches; determining that a report of security software was received from the endpoint and the endpoint has received data from the one or more trusted security product vendors; or determining that the endpoint has deviated from an established pattern of network traffic behavior with the set of one or more trusted security product vendors.

In some implementations, generating the ranked list of the plurality of endpoints comprises: ordering the one or more of the endpoints in the ranked list based on the security status score.

In some implementations, the operations further comprise providing a user interface that includes the ranked list, wherein one or more endpoints within the ranked list that have a security status score that meets a score threshold are highlighted in the user interface.

In some implementations, the operations further comprise: receiving a selection of a disposition for one or more selected endpoints of the prioritized list; and performing the selected disposition.

In yet another aspect, a threat management computer system for managing active security threats on an enterprise network comprises: a memory with instructions stored thereon; a processing device, coupled to the memory, the processing device configured to access the memory and execute the instructions; and a network device coupled to the processing device and configured to receive network traffic caused by a plurality of endpoints, wherein the instructions cause the processing device to perform operations including: monitoring the network traffic, wherein the network traffic for each endpoint includes sent data that is transmitted from the endpoint and received data that is received by the endpoint over the enterprise network; for each endpoint, identifying a plurality of destination addresses from the sent data and a plurality of source addresses from the received data; and determining a security status score for the endpoint based on a comparison of the plurality of destination addresses and the plurality of source addresses with network activity associated with one or more trusted security product vendors; determining a disposition for one or more of the endpoints based on the security status score; and automatically performing the determined disposition.

BRIEF DESCRIPTION OF THE DRAWINGS

FIG. 6A is a diagram of an example user interface to manage enterprise network activity, in accordance with some implementations.

FIG. 6B is a diagram of an example user interface to manage enterprise network security, in accordance with some implementations

DETAILED DESCRIPTION

One or more implementations described herein relate to using network traffic to determine security states of endpoints operatively coupled to a computer network, and to manage threats based on the determined security states. Generally, computer networks may allow access by personal devices (e.g., public WIFI networks, guest access on home networks, BYOD policies on enterprise networks, etc.). However, network administrators or security management tools may not have visibility into a security state of these personal devices.

For example, in a given computer network, there may be managed and unmanaged endpoints on a network. Managed endpoints may have security software that is administered by the network administrators, and may have an agent (e.g., security agent, administrative agent, or other security software) that can report the security status of the endpoint. An administrator that wants to determine the security status of a managed endpoint may be able to access a management console on premise at the enterprise or in the cloud to determine the status of a given endpoint or to see a report of the security status (e.g., security state) of a given endpoint. The security status can include, for example, whether a given endpoint has a security agent running and whether that agent has the latest updates (e.g., security patches or software updates). The security status can include, for example, whether the device has the latest operating system updates or updates for other applications that execute on the endpoint. The security status can include, for example, whether the device performs regular lookups in association with other network traffic. The security status can also include, for example, whether the endpoint device checks for updates associated with software on the endpoint. The security status can also include, for example, whether the device communicates status information or other information to a security or administrative server.

However, even if a given endpoint is managed, some endpoints on a network may have an agent installed that is from a different vendor than other endpoints, and so it may not be easy for an administrator to keep track or to determine which devices have which security or administrative agents. For example, an administrator may need to check management consoles for different vendors' software to find a given device to determine if it is managed and also to check on the current software/security status.

The below detailed description is presented in reference to these and other scenarios where network administrators can benefit from knowing a security state, and/or from identifying potential security threats due to unmanaged devices or endpoints.

Figure 1:
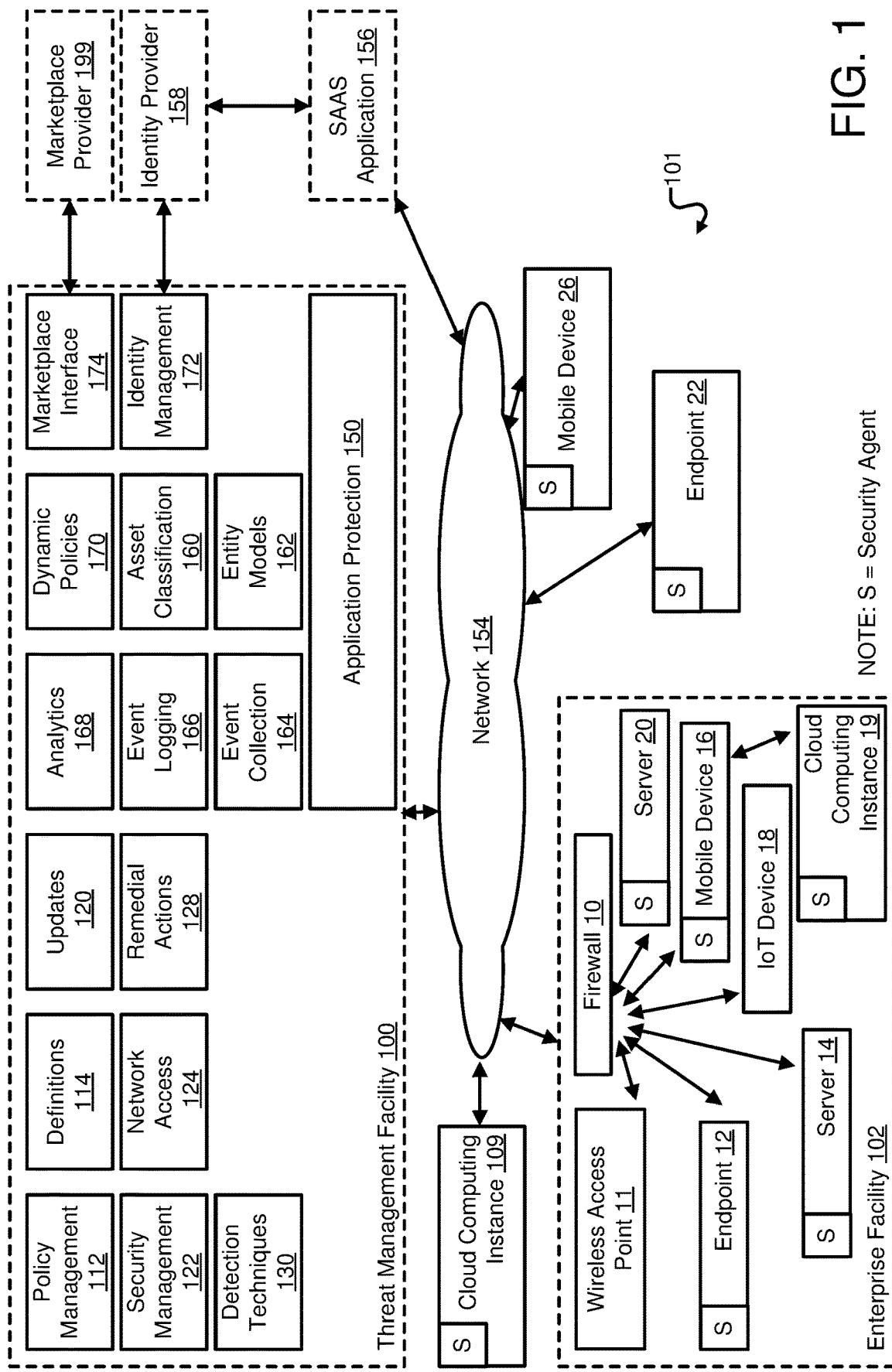
FIG. 1 is a diagram of an example enterprise network threat management system, in accordance with some implementations.

FIG. 1 depicts a block diagram of a threat management system 101 providing protection against a plurality of threats, such as malware, viruses, spyware, cryptoware, adware, ransomware, trojans, spam, intrusion, policy abuse, improper configuration, vulnerabilities, improper access, uncontrolled access, and more. A threat management facility or network monitor 100 may communicate with, coordinate, and control operation of security functionality at different control points, layers, and levels within the system 101. A number of capabilities may be provided by the threat management facility 100, with an overall goal to intelligently monitor network traffic from endpoints / hosts to known security product update sites. The threat management facility 100 can monitor the traffic passively and analyze the traffic. The threat management facility 100 may be or may include a gateway such as a web security appliance that is actively routing and/or assessing the network requests for security purposes. Another overall goal is to provide protection needed by an organization that is dynamic and able to adapt to changes in compute instances and new threats due to personal or unmanaged devices using the enterprise network. According to various aspects, the threat management facility 100 may provide protection from a variety of threats to a variety of compute instances in a variety of locations and network configurations.

As one example, users of the threat management facility 100 may define and enforce policies that control access to and use of compute instances, networks, and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications, and data available from servers, applications, and data permitted to be accessed by endpoints, and network resources and data permitted to be run and used by endpoints. The threat management facility 100 may provide many different services, and policy management may be offered as one of the services.

Turning to a description of certain capabilities and components of the threat management system 100, an example enterprise facility 102 may be or may include any networked computer-based infrastructure. For example, the enterprise facility 102 may be corporate, commercial, organizational, educational, governmental, or the like. As home networks can also include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown as one example, and it will be understood that there may be any number of compute instances, less or more of each type of compute instances, and other types of compute instances.

As shown, the example enterprise facility includes a firewall 10, a wireless access point 11, an endpoint 12, a server 14, a mobile device 16, an appliance or Internet-of-Things (IoT) device 18, a cloud computing instance 19, and a server 20. One or more of 10-20 may be implemented in hardware (e.g., a hardware firewall, a hardware wireless access point, a hardware mobile device, a hardware IoT device, a hardware etc.) or in software (e.g., a virtual machine configured as a server or firewall or mobile device). While FIG. 1 shows various elements 10-20, these are for example only, and there may be any number or types of elements in a given enterprise facility. For example, in addition to the elements depicted in the enterprise facility 102, there may be one or more gateways, bridges, wired networks, wireless networks, virtual private networks, virtual machines or compute instances, computers, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In various implementations, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122. According to some implementations, the marketplace provider 199 is a trusted security vendor that can provide one or more security software products to any of the compute instances described herein. In this manner, the marketplace provider 199 may include a plurality of trusted security vendors that are used by one or more of the illustrated compute instances.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

The identity provider 158 may provide user identity information, such as multi-factor authentication, to a software-as-a-service (SaaS) application. Centralized identity providers may be used by an enterprise facility instead of maintaining separate identity information for each application or group of applications, and as a centralized point for integrating multifactor authentication. The identity management facility 172 may communicate hygiene, or security risk information, to the identity provider 158. The identity management facility 172 may determine a risk score for a particular user based on events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

The threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as SaaS application 156. The SaaS application 156 may be an application that is used by but not operated by the enterprise facility 102. Example commercially available SaaS applications 156 include Salesforce, Amazon Web Services (AWS) applications, Google Apps applications, Microsoft Office 365 applications, and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

Aspects of the threat management facility 100 may be provided as a stand-alone solution. In other implementations, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In some implementations, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an implementation, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an implementation, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

According to one implementation, the security management facility 122 may provide for network monitoring and access control, which generally controls access to and use of network connections, while also allowing for monitoring as described herein. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. According to various implementations, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

The security management facility 122 may also provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

The security management facility 122 may provide also for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In some implementations, some reputation information may be stored on a compute instance 10-26, and other reputation data available through cloud lookups to an application protection lookup database, such as may be provided by application protection 150.

In some implementations, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. Feedback may enable the evaluation or profiling of client actions that are violations of policy that may provide a predictive model for the improvement of enterprise policies as well as detection of emerging security threats.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In some implementations, updates may be provided to the enterprise facility's 102 network, where one or more compute instances on the enterprise facility's 102 network may distribute updates to other compute instances.

According to some implementations, network traffic associated with the update facility functions may be monitored to determine that personal devices and/or unmanaged devices are appropriately applying security updates. In this manner, even unmanaged devices may be monitored to determine that appropriate security patches, software patches, virus definitions, and other similar code portions are appropriately updated on the unmanaged devices.

The threat management facility 100 may include a policy management facility 112 that manages rules or policies for the enterprise facility 102. Example rules include access permissions associated with networks, applications, compute instances, users, content, data, and the like. The policy management facility 112 may use a database, a text file, other data store, or a combination to store policies. A policy database may include a block list, a black list, an allowed list, a white list, and more. As non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Example policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In one implementation, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

The threat management facility 100 may provide configuration management as an aspect of the policy management facility 112, the security management facility 122, or a combination thereof. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

The policy management facility 112 may also require update management (e.g., as provided by the update facility 120). Update management for the security facility 122 and policy management facility 112 may be provided directly by the threat management facility 100, or, for example, by a hosted system. In some implementations, the threat management facility 100 may also provide for patch management, where a patch may be an update to an operating system, an application, a system tool, or the like, where one of the reasons for the patch is to reduce vulnerability to threats.

In some implementations, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In one implementation, the policy management facility 112 and the security facility 122 may work in concert with the update management facility 120 to provide information to the enterprise facility's 102 network and/or compute instances 10-26. In various implementations, policy updates, security updates, and other updates may be provided by the same or different modules, which may be the same or separate from a security agent running on one of the compute instances 10-26. Furthermore, the policy updates, security updates, and other updates may be monitored through network traffic to determine if endpoints or compute instances 10-26 correctly receive the associated updates.

As threats are identified and characterized, the definition facility 114 of the threat management facility 100 may manage definitions used to detect and remediate threats. For example, identity definitions may be used for recognizing features of known or potentially malicious code and/or known or potentially malicious network activity. Definitions also may include, for example, code or data to be used in a classifier, such as a neural network or other classifier that may be trained using machine learning. Updated code or data may be used by the classifier to classify threats. In some implementations, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need-to-know data, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In some implementations, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of web sites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An example event may be communication of a specific packet over the network. Another example event may be identification of an application that is communicating over a network. These and other events may be used to determine that a particular endpoint includes or does not include actively updated security software from a trusted vendor.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility122. Observations or inferences about events may also be logged by the event logging facility 166.

When a threat or other policy violation is detected by the security management facility 122, the remedial action facility 128 may be used to remediate the threat. Remedial action may take a variety of forms, including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
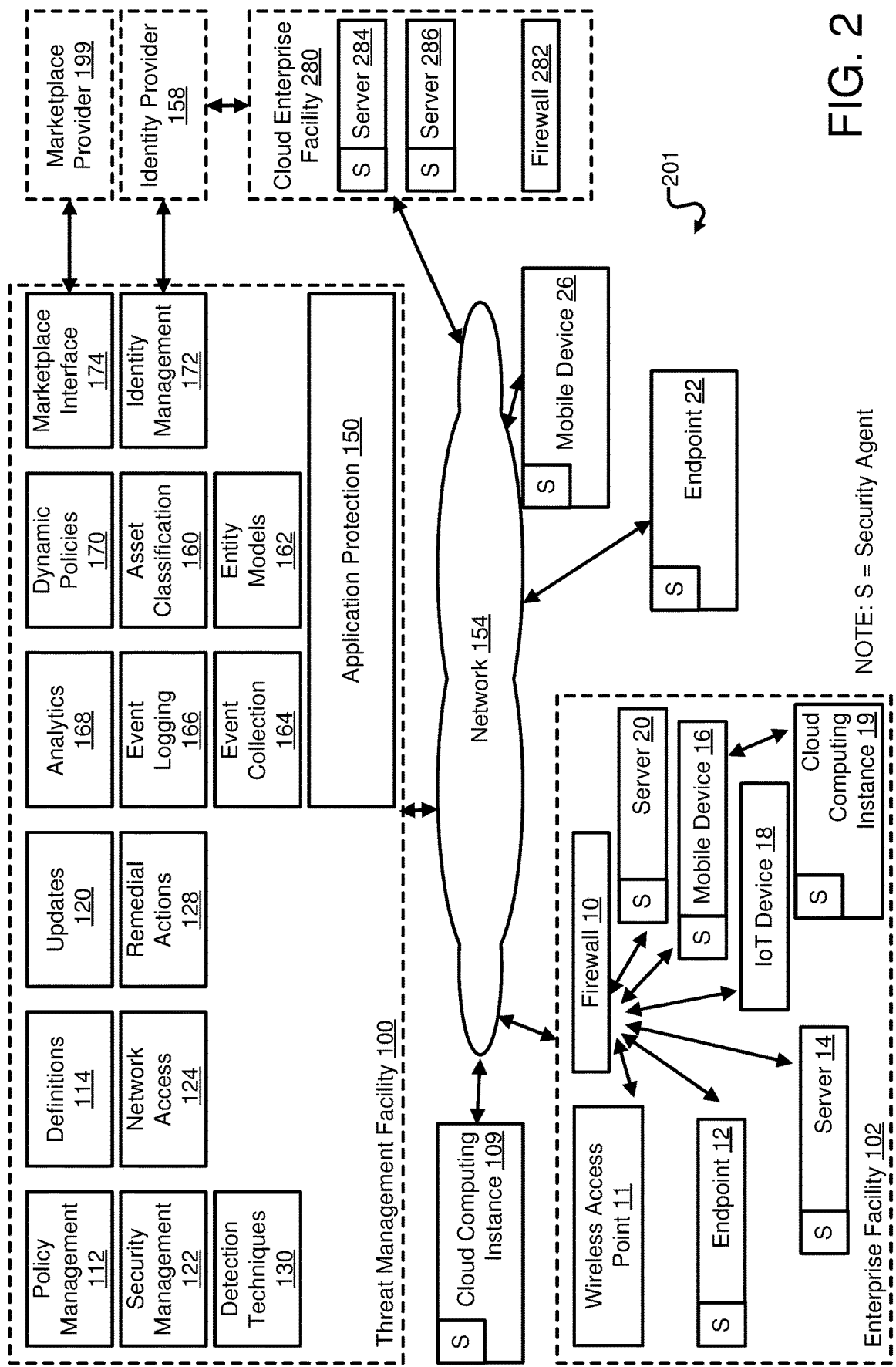
FIG. 2 is a diagram of an example enterprise network threat management system, in accordance with some implementations.

FIG. 2 depicts a diagram of a threat management system 201 such as any of the threat management systems described herein, and additionally including a cloud enterprise facility 280. Generally, systems 101 and 201 are similar; therefore, superfluous description of like elements is omitted herein for the sake of brevity and clarity of disclosure.

The cloud enterprise facility 280 of system 201 may include servers 284, 286, and a firewall 282. The servers 284, 286 on the cloud enterprise facility 280 may run one or more enterprise applications and make them available to the compute instances 10-26 of enterprise facility 102. It should be understood that there may be any number of servers 284, 286 and firewalls 282, as well as other compute instances in a given cloud enterprise facility 280. It also should be understood that a given enterprise facility may use either or both of SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
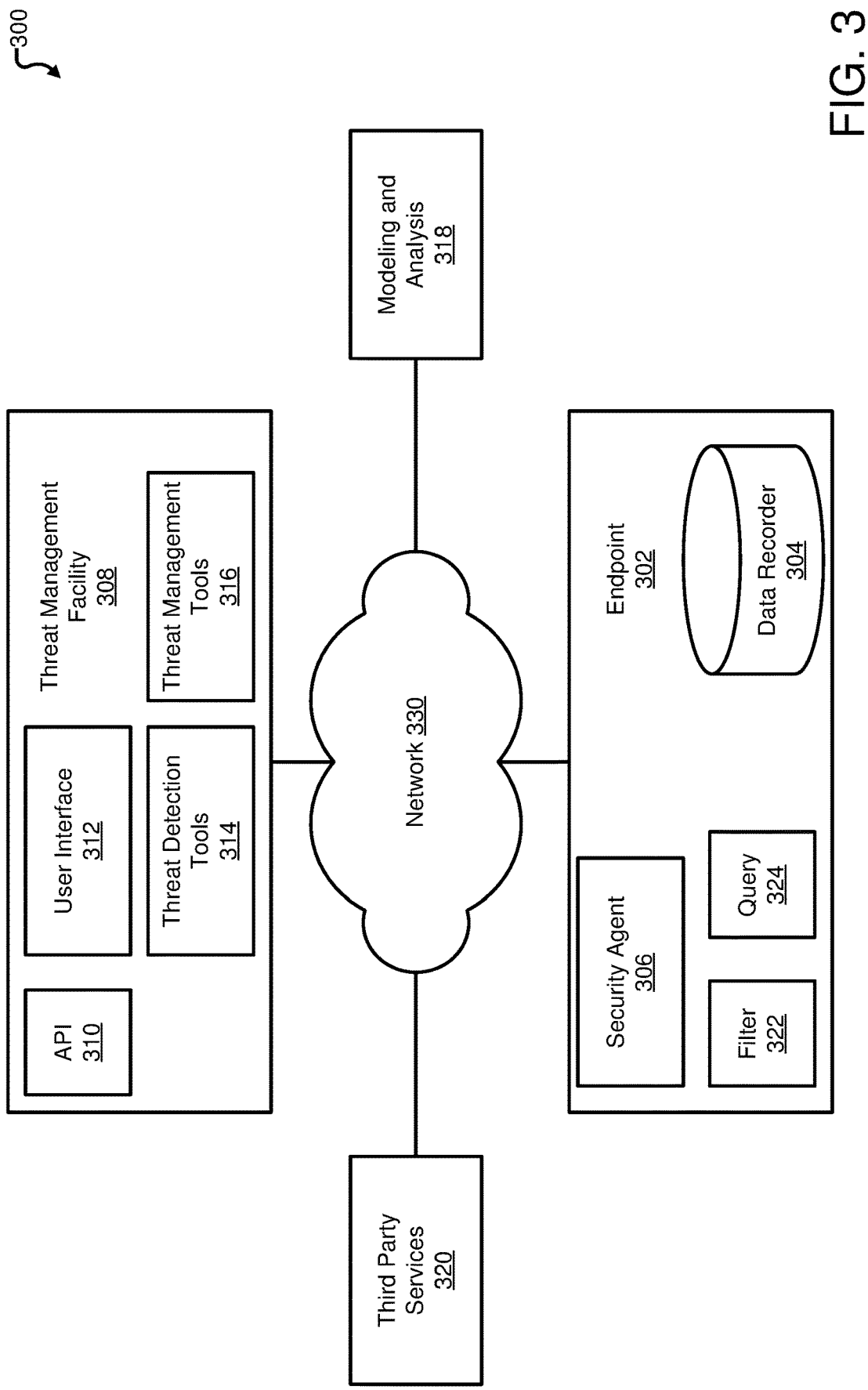
FIG. 3 is a schematic of an example enterprise network threat management system, in accordance with some implementations.

FIG. 3 shows a system 300 for enterprise network threat detection. System 300 may include one or more endpoints, e.g., endpoint 302; a threat management facility 308 (e.g., similar to facility 100 of FIGS. 1 and 2); a modeling and analysis platform 318; and one or more third party services 320 (hosted on third party computing devices, all coupled via network 330. The system 300 may use any of the various tools and techniques for threat management described herein.

Endpoints such as the endpoint 302 may log events in a data recorder 304, e.g., a database or other storage. A local agent on the endpoint 302 such as the security agent 306 may filter this data and feed a filtered data stream to a threat management facility 308 such as a central threat management facility or any of the other threat management facilities described herein.

The threat management facility 308 can locally or globally tune filtering by local agents based on the current data stream, and can query local event data recorders for additional information where necessary or helpful in threat detection or forensic analysis. The threat management facility 308 may also (or alternatively) store and deploy a number of security tools such as a web-based user interface that is supported by machine learning models to aid in the identification and assessment of potential threats by a human user. This may, for example, include machine learning analysis of new network traffic, models to provide human-readable context for evaluating potential threats, and any of the other tools or techniques described herein. More generally, the threat management facility 308 may include one or more of a variety of threat management tools 316 to aid in the detection, evaluation, and remediation of threats or potential threats.

The threat management facility 308 may perform a range of threat management functions such as any of those described herein. In some implementations, the threat management facility 308 may provide an application programming interface 310 for third party services 320 from trusted security vendors, a user interface 312 for access to threat management and network administration functions, and one or more threat detection tools 314.

In general, the application programming interface 310 may support programmatic connections with third party services 320 that facilitate exchange of data between threat management facility 308 and third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate curation of potential threats, e.g., by presenting threats along with other supplemental information, and providing controls for a user to dispose of such threats as desired, e.g., by permitting execution or access, by denying execution or access, or by engaging in remedial measures such as sandboxing, quarantining, vaccinating, and so forth.

The threat detection tools 314 may include any of the threat detection tools, algorithms, or techniques described herein, or any other tools for detecting threats or potential threats within an enterprise network. This may, for example, include network behavioral tools, machine learning models, and so forth. In general, the threat detection tools 314 may use network traffic data caused by endpoints within the enterprise network, as well as any other available context such as heartbeats, to detect malicious software or potentially unsafe conditions for a network or endpoints connected to the network. In one aspect, the threat detection tools 314 may usefully network activity data from a number of endpoints (including, e.g., network components such as gateways, routers and firewalls) for improved threat detection in the context of complex or distributed threats. The threat detection tools 314 may also or instead include tools for reporting to a separate modeling and analysis platform 318, e.g., to support further investigation of security issues, creation or refinement of security status detection models or algorithms, review, and analysis of security breaches and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances described herein. This may, for example, include end-user computing devices, mobile devices, firewalls, gateways, servers, routers, and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302.

Additionally, as described herein, unmanaged endpoints or endpoints without actively updated security software may also be identified through the threat detection tools 314. For example, while a number of endpoints 302 may actively download updates or security patches, the threat detection tools 314 may identify a suspicious lack of network activity for these devices. Under these circumstances, the unmanaged endpoints may be determined to be more likely to warrant further review and/or remediation by a network administrator.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

While unmanaged endpoints may or may not include a data recorder, network activity associated with typical data recording activities may be used to infer whether other endpoints include actively managed data recorders, and thus, likely include trusted security products installed thereon.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network and the like. The level of reporting may also or instead be based on currently available network and computing resources, or any other appropriate context.

In another aspect, the endpoint 302 may include a query interface 324 so that remote resources such as the threat management facility 308 can query the data recorder 304 for additional information. This may include a request for specific events, activity for specific computing objects, or events over a specific time frame, or some combination of these. Thus for example, the threat management facility 308 may request all changes to the registry of system information for the past forty eight hours, all files opened by system processes in the past day, all network connections or network communications within the past hour, or any other parameterized request for activities monitored by the data recorder 304. In another aspect, the entire data log, or the entire log over some predetermined window of time, may be requested for further analysis at a remote resource.

Using intelligent comparison of data logs from managed endpoints, the threat detection tools 314 may also identify patterns of network activity from unmanaged endpoints that correlated to these data logs. As such, inferences as to security software activity on unmanaged endpoints may be made, and an associated assumption as to the likelihood of an unmanaged endpoint having security software installed thereon may be made.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. Furthermore, unmanaged endpoints may be monitored (e.g., associated network traffic may be monitored) and compared to activity associated with the endpoint 302 such that inferences as to the security status of the unmanaged endpoints can be made. The threat management facility may be configured to receive the filtered event stream from the endpoint, compare this event stream to network activity amongst other, unmanaged endpoints, and recommend review of endpoints where inconsistencies in network traffic exist. Additionally, the threat management facility can effectuate remediation of endpoints when suspicious activity is detected.

Figure 4:
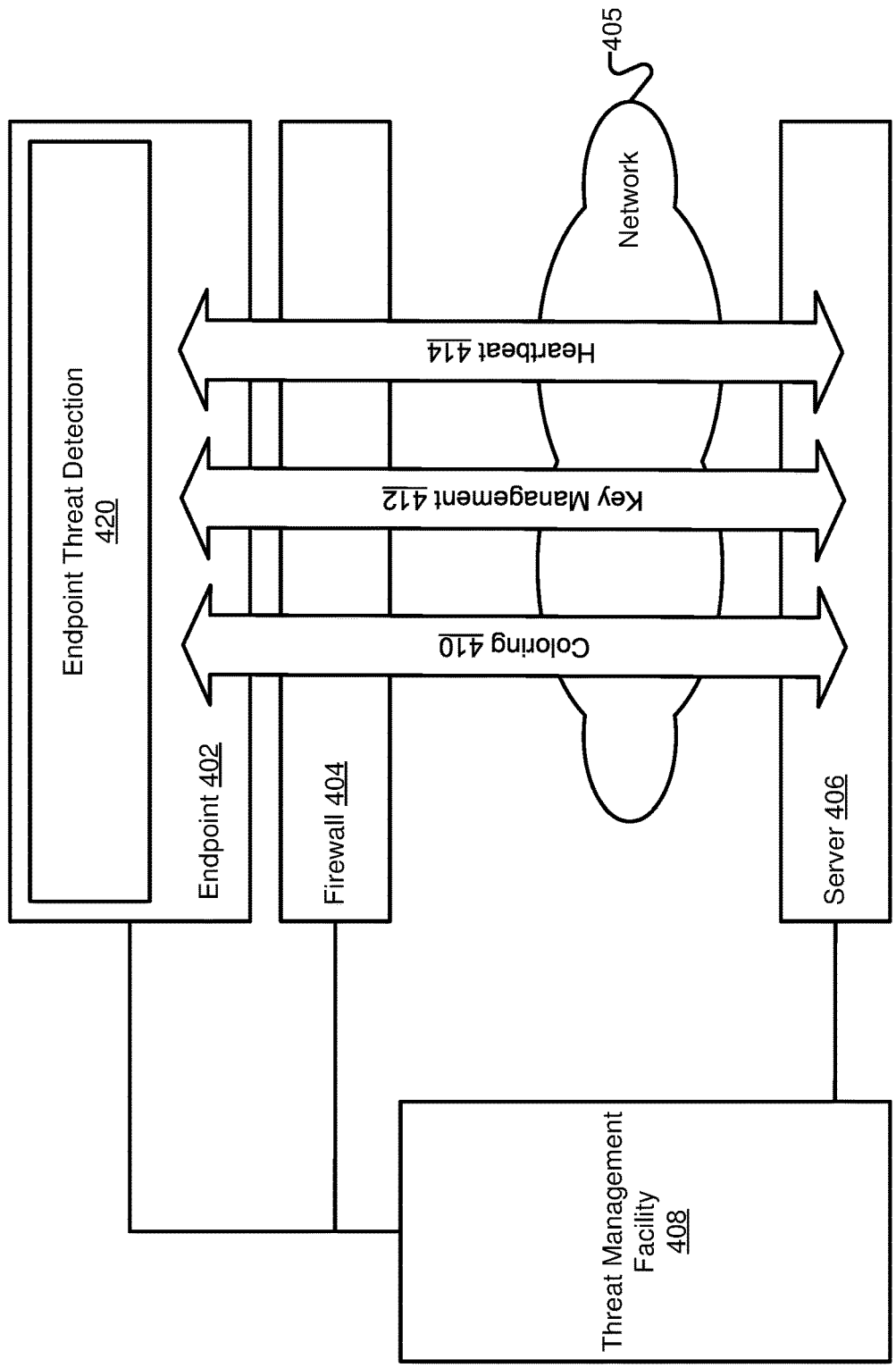
FIG. 4 is a block diagram of an example enterprise network threat management system, in accordance with some implementations.

FIG. 4 is a block diagram of an enterprise network threat management system. In general, the system may include an endpoint 402, a firewall 404, a server 406, and a threat management facility 408 coupled to one another directly or indirectly through a data network 405, as described above. Each of the entities depicted in FIG. 4 may, for example, be implemented on one or more computing devices such as the computing device described herein. A number of systems may be distributed across these various components to support threat detection, such as a coloring system 410, a key management system 412, and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

In general, these monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted or otherwise modified. More generally, the cooperation of these systems enables a wide variety of reactive measures that can improve detection and remediation of potential threats to an endpoint.

Figure 5:
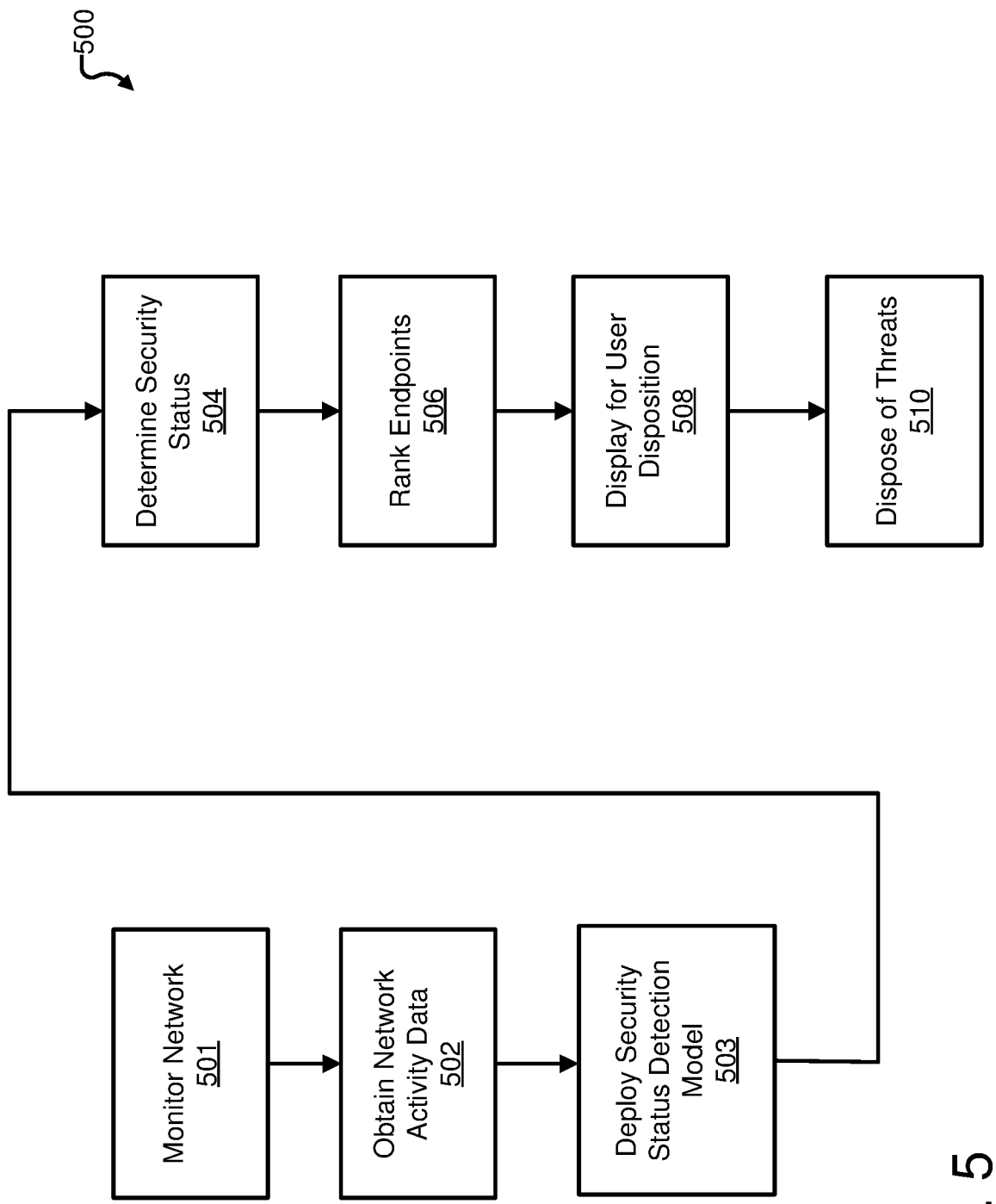
FIG. 5 is a flow diagram of an example method to detect enterprise network threats, in accordance with some implementations.

FIG. 5 shows a flow chart of an example method 500 to detect enterprise network threats. In general, various detection techniques are used to identify potential threats. For example, machine learning techniques may be used to evaluate suspiciousness based on network activity or a lack thereof during security update processes for managed endpoints. By filtering and prioritizing threats with these tools, automated threat mitigation actions can be performed and/or human threat intervention can advantageously be directed toward contexts most appropriate for non-automated responses.

Method 500 may begin at block 501. At block 501, endpoints on a network may be monitored. Generally, some endpoints may have security software installed thereon. Network activity for the endpoints may be monitored, e.g., using self-reporting by the endpoints and associated data recorders, such that robust logs of network activity are obtained which may be used to train a security status detection model. In addition or instead, network activity may be obtained by monitoring the network on which the endpoints are deployed, for example, by a firewall, gateway, or other network monitor. Network requests for security information may be made by endpoints. For example, security information or updates from security vendors may be requested by the endpoints.

Model training may be performed using the training data and a suitable training method. For example, to train a machine learning model, unsupervised learning or supervised learning algorithms may be used. For example, if the type or vendor of security software deployed on the endpoint is known, training data may be labeled with this information. For example, if a given endpoint is known to be unable to deploy security software, training data may be labeled with this information.

It should be understood that in some cases endpoints may be deployed specifically for the purpose of monitoring network activity for the purpose of determining training data, and in addition or instead endpoints that are already deployed may provide training data (e.g., network data). Accordingly, while described as being "deployed," existing endpoints may also be used. For example, network traffic in existing networks may be used for generating training data. The method continues at block 502.

At block 502, network activity for the endpoints (or trusted, managed endpoints) may be obtained, e.g., for training as described above. The method continues at block 503.

At block 503, a security status detection model may be generated and deployed. This may, for example, include a machine learning model (or other suitable model) of known or expected network activity trained using known network activity data. The training data may be generated by providing endpoints, monitoring endpoints, and/or receiving associated network activity data. Block 503 may be followed by block 504.

At block 504, the security status of endpoints may be determined using the security status detection model by monitoring network activity with a network monitor (e.g., by the threat management facility 100/308 and/or a network monitor on a gateway or firewall, and/or a passive network monitor observing activity on a network). It is noted that as robust network activity logs may be provided by managed endpoints and/or a network monitor, the network activity (data sent or received by a given endpoint, which may be encrypted) need not necessarily be decrypted. Rather, unencrypted information such as source and/or destination network addresses (e.g., Internet Protocol addresses, Uniform Resource Locators (URLs), web addresses, and/or other suitable network addresses) and the size of traffic may be extracted from the network activity logs and provided as input to the model. Accordingly, passive network monitoring may be employed to achieve a fast, reliable network monitoring solution.

The security status of a given endpoint may be assigned to that endpoint for use in threat assessment. Tagging may be employed, which may include human sorting and tagging according to empirical observations of behavior relevant or potentially relevant to security. This may also include human sorting and curating of machine-assigned tags. The resulting tags may be used when training models, and may advantageously permit a neural network or other machine learning model to simultaneously draw multiple inferences about network observations.

As described above, the threat management facility (e.g., 100/308), using the security status detection model, can determine endpoints that may be vulnerable to potential threats. For example, the threat management facility can determine whether there are network connection requests to servers associated with a security vendor, e.g., a provider of security software. An assessment can then be made about whether the endpoint is likely to be running that security software. For example, the threat management facility 308 can determine the extent to which (e.g., whether and when) there have been network connection requests to servers associated with updates to the security software, for example, to determine whether updates for the latest threats have been communicated to the endpoint. In some cases, the threat management facility may be able to determine whether there are specific updates or types of lookups/downloads requested from the security vendor by the endpoint. For example, a given vendor's security software might perform domain or website reputation lookups when the device makes a website request to a new website. Requests to a given vendor's servers before new network requests would be indicative of security software deployed on the endpoint. Additionally, a given security vendor may have rule and signature updates that are communicated regularly and/or periodically (e.g., daily or even more frequently), and software updates that are communicated monthly.

For example, the threat management facility can determine the extent to which (e.g., whether and when) there have been network connection requests to servers associated with operating system or application software updates, for example, to determine whether updates that address known vulnerabilities in operating system have been communicated to the endpoint. For example, an operating system vendor may provide weekly updates, which may be downloaded by a given device around the same time every week. Depending on the update protocol employed by a given security, operating system, or application vendor, it is possible for a network device to observe what updates (e.g., what files, what signature sets) have been requested and/or received. It is also possible from observation of the size of network traffic (e.g., by determining that during a given period of time 200 kb was received from a given vendor's update server), to determine whether an update was received. Depending on the update protocol used by the vendor, it may be possible to determine which security product from a given vendor, or what version of the security product is in use, as well as an update status. For example, if the security software from a particular vendor typically checks for updates from the vendor's update servers every 4 hours, or this device has been observed to check for updates from the vendor's update servers every 4 hours, and the device has not checked for updates longer than that, this may be flagged as an anomaly. The anomaly detection may take into account whether there is other traffic from the host to indicate that it is active yet not seeking updates.

Additionally, an update status of security software, operating system, and/or application software may be determined from observed network traffic. The update status may be used to determine a potential for a given vulnerability. So, for example, all devices with "Windows 10" operating system that have not yet been observed to update to a certain level or to have received certain updates may be flagged as vulnerable, escalated in alerting, or blocked from certain activity.

The security posture (e.g., endpoint has protection, does not have protection) and the status (e.g., endpoint has latest updates, endpoint updates requested, does not have latest updates, endpoint has not requested updates for longer than a given time period) may be provided to a data lake or used in combination with other information about the endpoint to make security decisions about the endpoint, such as whether to allow access to resources, whether to allow a network connection, whether to block all communications to/from the endpoint, whether to notify other endpoints that they should "shun" the endpoint.

Similar endpoints that have the same vendor's software would typically be expected to have similar patterns of network access and also to download similar updates, although they may share updates on the network, and they may operate on different schedules. So, servers with threat management facility 308 and associated security agent 306 installed would be expected to download the same updates within a period of time. As such, if the servers are sharing updates, the downloads may be from each other instead of from the vendor's servers, and this activity also may be observed. Block 504 may be followed by block 506.

In some implementations, a record of security software updates is maintained, aggregating information about vendor updates requested and received from endpoints in a given network or in multiple networks. For example, requests for vendor updates may be recorded as well as characteristics of responses. For example, after a given time, a particular vendor may respond to requests with updates of a given size. For example, a vendor update server may provide updates using specific URLs that are related to a version number or update number, and requests by an endpoint to those URLs may be recorded.

In some implementations, information about available updates offered by a vendor may be obtained from the vendor, for example, on their website or update server, through communication with the vendor, or through other means. The information about available updates may be compared to the updates requested by a given endpoint to determine the update status of the endpoint.

At block 506, based on the monitored network activity, a security characteristic of endpoints may be ranked based on observed characteristics and/or based on comparisons to known or expected network activity. In this regard, network activity that deviates from expectations may be scored or graded based on the likelihood that the security status of an endpoint presents a security threat. Various scoring methods may be used, including graduated scoring of any desired granularity.

According to one implementation, a security status score may be utilized for ranking at block 506. The security status score may include any suitable scoring methodology, including increasing scores for endpoints having security software with recent updates and presumably updated security software products executing thereon, and decreasing scores for unmanaged endpoints having no discernable security software products executing thereon. The security status score may be updated or adjusted periodically, for example, by correlating data transmissions to and from an endpoint to determine if data packets match known security patches. Furthermore, the security status scores may be adjusted on-the-fly if anomalous behavior is detected, for example, through malicious self-reports of security updates where no transmissions are occurring with trusted security vendors. In this manner, highly suspicious endpoints may be highlighted or accentuated within the ranked security characteristics such that network administrators may be able to more readily identify potentially malicious behavior and take immediate remedial action, as discussed below. Block 506 may be followed by block 508.

At block 508, the ranked endpoints may be displayed for user investigation and/or disposition. User disposition may include any of the above tools for threat management, including quarantine and/or revocation of network access. Additionally, threats deemed potentially suspicious may be elevate the ranking based on a security status such that a network administrator may quickly and efficiently identify potential threats that may be managed or disposed quickly to ensure network reliability and security.

The security information determined by the threat management facility can be used in the displayed report to the administrator that shows (potential or assumed) security applications running on the devices on a network. For example, in a report of devices on a network, the report can include an indication of security software observed on the host. The report can also include an update status, for example, when updates for the security software were last requested and/or communicated to the device. The report can also include anomalous update behavior as compared to expected update behavior and/or as compared to update behavior of devices with a request history to the same or similar servers.

The report may be enhanced with information about which devices on the network have active security software and, for example, any assumed types of security software and/or vendor identification. For example, a report that shows all devices on a network also can include an indication of what security software has been observed from network activity to be running on the device and an update state. As another example, a report that shows all devices on a network can also include an indication of whether it has an active security agent that has requested updates on schedule, whether it has security software but the updates are not current, or whether it has no security software.

The report may include links to the administrative portal associated with the vendor. So, for example, for devices that have been determined to have a particular security vendor's software installed, a link to the server for this vendor-managed devices may be provided to enable quick access to administer the device. This may be accomplished by populating a list with the administrative links associated with security software that has been identified. Block 508 may be followed by block 510.

At block 510, any identified threats (e.g., based on observed network behavior and ranking of the endpoint) may be disposed of based on human selection, automated remedial actions, and/or a combination of the same. Using the machine learning techniques and automated scoring of endpoints, potentially malicious behavior may be quickly remediated based on network policy such that further malicious activity is mitigated.

Any other information may also be used in combination with the machine learning techniques described above as necessary or helpful to improve estimates of riskiness. Further, other machine learning models may be used in addition to or instead of the machine learning models described above, to the extent that such model(s) can be trained to accurately or usefully estimate risk. Thus, for example, if a machine learning model can be trained to accurately identify threats based on, e.g., access control lists, certificates, signatures, hashes, communications protocols, content, and so forth. Further, it may also be useful to apply a group of machine learning models with detection techniques that are generally uncorrelated to one another in order to provide greater sensitivity to various types of threats.

As described above, a system for computer assisted identification of security threats may include a memory storing a security status detection model configured to evaluate the security status of an endpoint based on a network activity correlation to expected network activity. The system may also include a threat management facility configured to apply the security status detection model to newly connected endpoints such that dynamic active management of BYOD and/or personal devices is possible. The system may also include a web server configured to display ranked endpoints and/or network activity in a user interface on an endpoint for evaluation. The web server may also be configured to present additional contextual information (e.g., based on potential threats, network activity, etc.) to a user through the user interface. The web server may also be configured to allow remedial actions such as quarantining or revocation of network access.

Turning to FIG. 6A, a user interface for enterprise threat management is illustrated. As shown, the user interface 600 includes a display of network activity 602 that may be identified by timestamps 604, subtypes 606, and source IP addresses 608. For example, each timestamp 604 may represent a time of day and date under which an active security threat was identified and an identified subtype of threat, which may include allowed or un-allowed threats connected to the enterprise network. The source IP address 608 may identify the particular IP address associated with the ranked endpoint. Furthermore, a destination IP address 610 may identify a particular destination IP address from which network communication was monitored.

To further aid in managing potential enterprise network threats, a categorization 612 may be used to group identified threats. For example, categories may include types of websites or destination IP addresses (e.g., Information Technology websites, Security Product websites, Internal websites, etc.). In some implementations, Security Product update sites may be included in or identified as a category separate from Security Product web sites.

As further shown, a name, URL, or other identifying data 614 may be displayed. According to at least one implementation, the identifying data 614 may identify a known or assumed security vendor whose software is executing on a managed or unmanaged endpoint. Therefore, a network administrator may readily identify which (if any) security programs are executing (and possibly updating) on particular endpoints, regardless of whether the endpoints are managed by the network administrator directly. The identifying data 614 may also include known security domain websites and other identifying data associated with network traffic to/from an endpoint.

As further shown, transmission sizes of sent and received data packages 616, 618 may be displayed. The transmission sizes may be used to correlate known requests, downloads and updates, e.g., security updates and patches, to determine whether updates have been requested and received. Also, discrepancies can be used to identify potentially "spoofed" security packages, e.g., where an endpoint self-reports receiving security patches but transmission sizes do not match actual patches distributed by trusted vendors. In this manner, network administrators may have a robust, visible display of potential security vulnerabilities such that actions 620 may be selected.

The actions 620 may include receiving additional information 622, disabling particular endpoints 624, and/or quarantining endpoints 626. Other actions may also be applicable in some implementations including "tagging" or coloring endpoints with suspicious activity, blocking requests to a particular network location or locations, scanning a requesting application or device, quarantine of a requesting application or the device, isolation of the requesting application or the device, deployment of a sandbox, blocking access to resources, e.g., a USB port, or other remedial actions.

Turning to FIG. 6B, a user interface for enterprise security management is illustrated. As shown, the user interface 650 includes a display of ranked or prioritized endpoints 648 for presentation to a user (e.g., a network administer). The interface 650 may display at least some of the endpoints operatively connected to the enterprise network, based on the security status scores, and based on associated rankings. Each displayed endpoint may be identified by an Endpoint ID 654 and/or an IP address 656.

The interface may also include a determination 658 of what security software has been observed from network activity to be running on the device and an update state 662. The interface 650 can also include an indication 660 of whether an endpoint has an active security agent that has requested updates on schedule, whether it has security software but the updates are not current, or whether it has no security software.

Additional information, including links to security portals, links to associated servers for vendor-managed devices, links to administrator portals associated with a particular security product, and other such data and links may be provided to enable quick access to administer the ranked endpoint. Furthermore, additional actions such as disposition actions, remedial actions, and other actions 668 may be presented for each endpoint identified in the interface 650.

As described above, ranked, prioritized lists of endpoints that are potentially vulnerable (and therefore that may present a security threat to an enterprise network) may be presented to users or network administrators such that remedial actions can be properly taken. Hereinafter, a more detailed description computer-assisted network security management is presented with reference to FIG. 7.

Figure 7:
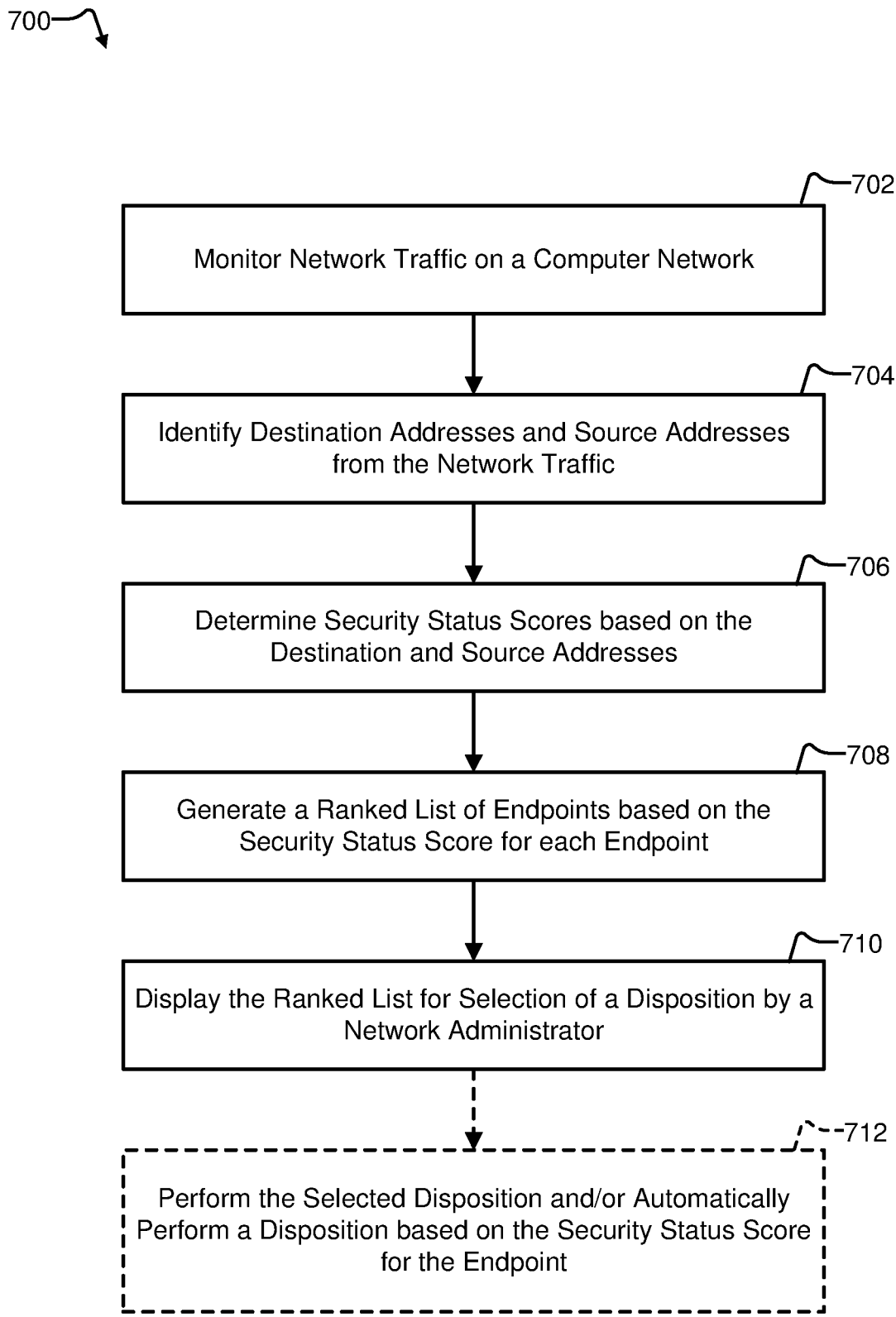
FIG. 7 is a flowchart of an example method to determine security states and to manage threats in a computer network based on network traffic, in accordance with some implementations.

FIG. 7 is a flowchart of an example method 700 of using network traffic to determine security states and managing threats, in accordance with some implementations. The method 700 begins at block 702.

At block 702, a server or threat management facility (100/308) monitors network traffic on a computer network that includes a plurality of endpoints. For example, the computer network may be embodied as an enterprise computer network and the endpoints may include user-provided endpoints such as personal tablet computers, mobile phones, laptops, and other devices, as well as enterprise-managed endpoints. Additionally, the network traffic for each endpoint includes sent data that is transmitted from the endpoint and received data that is received by the endpoint over the computer network. The network traffic may include, for example, a size of an update request, a format of an update request, a destination of an update request, a size of update downloads, a timing of update requests, a timing of update downloads, a similarity of requests/downloads to requests/downloads of other endpoints associated with the security vendor, requests to network vendor reputation servers in close time proximity preceding network requests, and other network traffic. The network traffic may be monitored for anomalies and differences from typical or expected network activity. The method 700 continues with blocks 704 and 706, which may be performed for each endpoint on the enterprise network.

At block 704, the server or threat management facility 308 identifies a plurality of destination addresses from the sent data and a plurality of source addresses from the received data. For example, as illustrated in FIG. 6, the source and destination addresses may be organized by IP addresses and/or web addresses. The method 700 continues at block 706.

At block 706, the server or threat management facility 308 determines a security status score for the examined/monitored endpoint based on a comparison of the plurality of destination addresses and the plurality of source addresses with a set of known security addresses associated with one or more trusted security product vendors. Generally, the one or more trusted security product vendors includes only known vendors that are acceptable to an administrator of the enterprise network. A listing of trusted vendors may be updated periodically and may be vetted independently, for example, using endpoints and logged network activity as described above.

The security status score may include any suitable scoring methodology, including increasing scores for example for more secure endpoints such as endpoints having security software products executing thereon, and/or having updates, and decreasing scores for endpoints having no discernable security software products executing thereon and/or not having updates for operating system and/or applications. The security status score may be updated or adjusted periodically, for example, by correlating data transmissions to and from an endpoint to determine if data packets match known security updates or patches. Furthermore, the security status scores may be adjusted on-the-fly if anomalous behavior is detected, for example, through malicious self-reports of security updates where no transmissions are occurring with trusted security vendors. In this manner, vulnerable or potentially compromised endpoints may be highlighted or accentuated within the prioritized list such that network administrators may be able to more readily identify potential threats and take immediate remedial action or dispositions. The method 700 continues at block 708.

A security status score also may be used in combination with other observations about the activity of an endpoint. For example, observed activity that might be suspicious but not rise to the level of an alert on its own may be escalated based on the security status score and/or other observed activity. The security status score thus may be used in combination with other observed activity to identify endpoints, for example, that need attention by an administrator or analyst, raise alerts, require additional authentication or permission, and/or take automatic action such as scanning or blocking.

At block 708, the server or threat management facility 308 generates a ranked list of the plurality of endpoints based on the respective security status score for each endpoint. For example, the list may be ranked based on increasing (or decreasing) security status scores of each endpoint. The ranked list may be sent directly to a network administrator. The ranked list may also be used by automated network management software such that automated decisions on remedial actions and dispositions are taken up in an automated fashion based on risk. For example, the position in a ranked list may be used to raise/lower thresholds for other types of alerts, such that the position in the ranked list is used in combination with other observations about the activity of an endpoint or network. For example, observed activity that might be suspicious but not rise to the level of an alert on its own may be escalated based on the position in the ranked list and/or other observed activity. The position in the ranked list thus may be used in combination with other observed activity to identify endpoints, for example, that need attention by an administrator or analyst, raise alerts, require additional authentication or permissions, and/or take automatic action such as scanning or blocking.

In some implementations the position in a ranked list may be determined based in combination with other observations about the activity of an endpoint or network. For example, observed activity that might be suspicious may be used to increase a position in the ranked list. For example, information related to another vendor's software running on the endpoint, or information about the endpoint that reduces its exposure, may be used to decrease the position in the ranked list. Thus, additional information in addition to the security status may be used in combination to determine a position in the ranked list.

The method 700 continues at block 710.

At block 710, the ranked list is displayed in a user interface (e.g., interface 600) for selection of a disposition by a network administrator. The network administrator may identify endpoints presenting the greatest risk based on the ranking and/or any highlighting and/or accentuation. Thereafter, the network administrator may select from a number of actions (e.g., actions 620). This may include further investigation of the activity endpoint, more granular monitoring, running additional scans or tools, revisiting past activity including network activity and/or file system activity of the endpoint, and so on. A list of activity observations that may be suspicious but not rise to the level of an alert may be examined. The method 700 continues at block 712.

At block 712, the server or threat management facility 308 may perform the selected disposition that was selected by the network administrator. Alternatively, the server or threat management facility 308 may also automatically perform a disposition based on the security status score. For example, if the security status score exceeds a threshold, the server or threat management facility 308 may quarantine or disable network activity for the endpoint. Additionally, if automated remedial action is taken, further accentuation of the endpoint on the user interface 600 may be displayed, for example, by identifying activities that have been blocked or quarantined in fields 604-606.

As described above, various personal devices and endpoints may be successfully managed on enterprise networks through the methodologies described herein. Network activity on the enterprise network may be monitored and scrutinized to determine if security threats may exist based on correlation of network activity to known or established patterns of activity. The established patterns of activity may include the request and application of security patches, updates, and other software requests that are typical for an active security program product that is correctly executing on an endpoint. endpoints or thin clients may also be used to bolster training data for producing a security status detection model that can automatically identify potential security threats based on network activity.

Hereinafter, a more detailed description of various computing devices that may be used to implement different devices (e.g., the server 14 and/or endpoints 12, 22) illustrated in FIG. 1 and FIG. 2 is provided with reference to FIG. 8.

Figure 8:
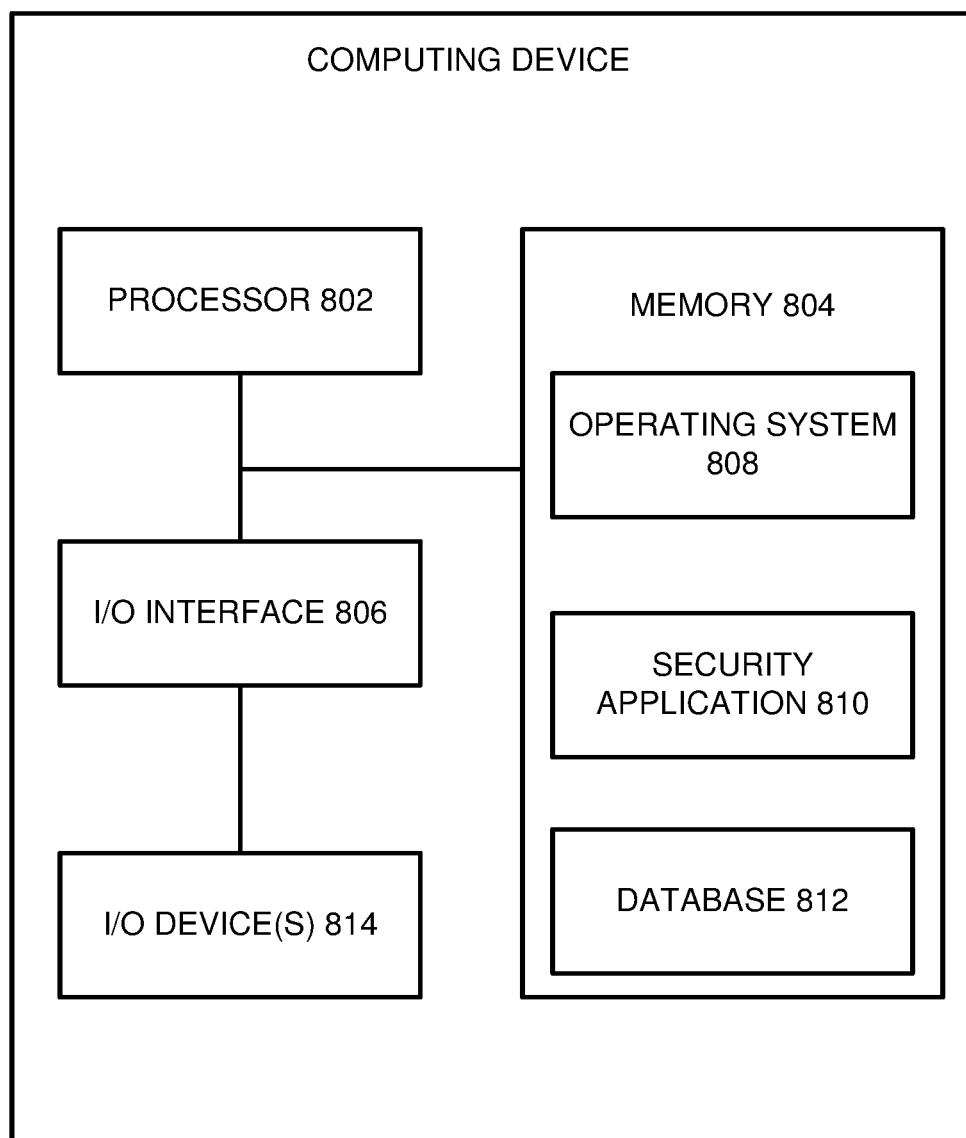
FIG. 8 is a block diagram illustrating an example computing device which may be used to implement one or more features described herein, in accordance with some implementations.

FIG. 8 is a block diagram of an example computing device 800 which may be used to implement one or more features described herein, in accordance with some implementations. In one example, device 800 may be used to implement a computer device, (e.g., 110 of FIG. 1), and perform appropriate method implementations described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814 (e.g., display screen, touchscreen, display goggles or glasses, audio speakers, microphone, etc.).

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, a security application or computer program product 810, and a database 812.

Memory 804 can include software instructions for executing the operations as described with reference to FIG. 1. Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 116), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 804, I/O interface 806, software blocks 808, and 810, and database 812. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a user device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more user devices, servers, and threat management facilities. In some implementations, one or more methods described herein can be implemented, for example, on a server system with a dedicated threat management facility, and/or on both a server system and any number of threat management facilities. In some implementations, different components of one or more servers and or user devices can perform different blocks, operations, or other parts of the methods.

One or more methods described herein (e.g., method 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
    monitoring, by a server, network traffic on a computer network that includes a plurality of endpoints, wherein the network traffic for each endpoint of the plurality of endpoints includes sent data that is transmitted from the endpoint and received data that is received by the endpoint over the computer network;
    for each of at least two endpoints of the plurality of endpoints,
        identifying a plurality of destination addresses from the sent data and a plurality of source addresses from the received data; and
        automatically determining, by the server, a security status score for the endpoint based on a comparison of the plurality of destination addresses and the plurality of source addresses with a set of known security addresses associated with one or more trusted security product vendors, wherein the security status score of the endpoint represents at least whether the endpoint has a security product from a trusted security product vendor executing thereon, and wherein automatically determining the security status score comprises increasing the security status score when the comparison indicates that the endpoint has received data from one or more security addresses of the set of known security addresses;
    generating a ranked list of the at least two endpoints of the plurality of endpoints based on respective security status scores;
    displaying, in a user interface, the ranked list of the at least two endpoints;
    receiving, from a user via the user interface, a selection of a disposition or a selection of a remedial measure for one or more selected endpoints from the ranked list; and
    performing, by the server or a threat management facility, the selected disposition or the selected remedial action.

2. The computer-implemented method of claim 1, wherein the network traffic is encrypted, wherein the destination addresses are destination Internet Protocol (IP) addresses, and wherein monitoring the network traffic comprises:
    passively monitoring the network traffic to determine the destination IP addresses that are associated with the plurality of endpoints without decrypting the network traffic.

3. The computer-implemented method of claim 2, wherein determining the security status score further comprises:
    correlating the destination IP addresses with the set of known security addresses; and
    adjusting the security status score based on the correlating such that endpoints with destination IP addresses that have a first correlation to the set of known security addresses are assigned higher security status scores than endpoints that have a second correlation less than the first correlation.

4. The computer-implemented method of claim 1, wherein the received data includes a plurality of data items, the method further comprising:
    determining a size of each of the plurality of data items; and
    wherein determining the security status score further comprises assigning a lower score for endpoints associated with received data items that have a size different than a known size of security product patches, and assigning a higher score for endpoints associated with received data items that have a size similar to the known size of security product patches.

5. The computer-implemented method of claim 1, further comprising:
    directing one or more endpoints of the plurality of endpoints to install a current version of security products from the trusted security product vendors; and
    building the set of known security addresses based on network traffic of the one or more endpoints with the current version of security products.

6. The computer-implemented method of claim 1, wherein the determining the security status score further comprises one or more of:
- determining that the endpoint has received data that matches known security patches from the known security addresses;
- determining that a report of security software was received from the endpoint and the endpoint has received data from the known security addresses; or
- determining that the endpoint has deviated from an established pattern of network traffic behavior with the set of known security addresses.

7. The computer-implemented method of claim 1, wherein generating the ranked list of the plurality of endpoints comprises:
- changing a position of at least one endpoint of the at least two endpoints in the ranked list based on the security status score and an observation of suspicious activity by the at least one endpoint.

8. The computer-implemented method of claim 7, wherein one or more endpoints within the ranked list that have a respective security status score that meets a score threshold are highlighted in the user interface.

9. The computer-implemented method of claim 8, wherein the ranked list identifies security compromised endpoints that do not have active security software installed thereon.

10. The computer-implemented method of claim 1, wherein:
- the disposition includes denying access to the one or more selected endpoints; and
- the remedial measure is selected from a group of sandboxing the one or more selected endpoints, quarantining the one or more selected endpoints, vaccinating the one or more selected endpoints, and combinations thereof.

11. A non-transitory computer-readable medium with instructions stored thereon that, responsive to execution by a processing device, causes the processing device to perform operations comprising:
- monitoring network traffic on a computer network that includes a plurality of endpoints, wherein the network traffic for a given endpoint includes sent data that is transmitted from the given endpoint and received data that is received by the given endpoint over the computer network;
- for each given endpoint, automatically determining a security status score for the given endpoint based on a comparison of the sent data and the received data with network traffic associated with one or more trusted security product vendors, wherein the security status score of the given endpoint represents at least whether the given endpoint has a security product from a trusted security product vendor executing thereon, and wherein automatically determining the security status score comprises increasing the security status score when the comparison indicates that the given endpoint has received data from at least one of the one or more trusted security product vendors;
- generating a ranked list of endpoints of plurality of endpoints based on respective security status scores for each endpoint of the plurality of endpoints;
- displaying, in a user interface, the ranked list of endpoints;
- receiving, from a user via the user interface, a selection of a disposition or a selection of a remedial measure for one or more selected endpoints from the ranked list; and
- performing the selected disposition or the selected remedial action.

12. The non-transitory computer-readable medium of claim 11, wherein the network traffic is encrypted, and wherein monitoring network traffic comprises:
- passively monitoring the network traffic to determine destination addresses that are associated with the plurality of endpoints without decrypting the network traffic.

13. The non-transitory computer-readable medium of claim 12, wherein determining the security status score further comprises:
- correlating the sent data with a set of known security addresses; and
- adjusting the security status score based on the correlating such that endpoints correlated to the set of known security addresses have higher security status scores than endpoints lacking correlation.

14. The non-transitory computer-readable medium of claim 11, wherein the received data includes a plurality of data items, the operations further comprising:
- determining a size of each of the plurality of data items; and
- reducing the security status score for an endpoint with data items that have a size different than a known size of security product patches.

15. The non-transitory computer-readable medium of claim 11, wherein the operations further comprise:
- directing one or more endpoints of the plurality of endpoints to install a latest version of security products from the trusted security product vendors; and
- building a set of known security addresses based on network traffic of the one or more endpoints.

16. The non-transitory computer-readable medium of claim 11, wherein the determining the security status score further comprises one or more of:
- determining that the given endpoint has received data from the one or more trusted security product vendors that matches known security patches;
- determining that a report of security software was received from the given endpoint and the given endpoint has received data from the one or more trusted security product vendors; or
- determining that the given endpoint has deviated from an established pattern of network traffic behavior with a set of one or more trusted security product vendors.

17. The non-transitory computer-readable medium of claim 11, wherein generating the ranked list of endpoints further comprises:
- changing a position of at least one given endpoint of the plurality of endpoints in the ranked list based on the security status score and an observation of suspicious activity by the at least one endpoint.

18. The non-transitory computer-readable medium of claim 17, wherein one or more endpoints within the ranked list that have a security status score that meets a score threshold are highlighted in the user interface.

19. The non-transitory computer-readable medium of claim 11, wherein:
- the disposition includes denying execution or access to the one or more selected endpoints; and
- the remedial measure is selected from a group of sandboxing the one or more selected endpoints, quarantining the one or more selected endpoints, vaccinating the one or more selected endpoints, and combinations thereof.

20. A threat management computer system for managing active security threats on an enterprise network, comprising:
a memory with instructions stored thereon;
a processing device, coupled to the memory, the processing device configured to access the memory and execute the instructions; and
a network device coupled to the processing device and configured to receive network traffic caused by a plurality of endpoints, wherein the instructions cause the processing device to perform operations including:
monitoring the network traffic, wherein the network traffic for each endpoint of the plurality of endpoints includes sent data that is transmitted from the endpoint and received data that is received by the endpoint over the enterprise network;
for each endpoint of the plurality of endpoints,
   identifying a plurality of destination addresses from the sent data and a plurality of source addresses from the received data; and
   automatically determining a security status score for the endpoint based on a comparison of the plurality of destination addresses and the plurality of source addresses with network activity associated with one or more trusted security product vendors, wherein the security status score of the endpoint represents at least whether the endpoint has a security product from a trusted security product vendor executing thereon, and wherein automatically determining the security status score comprises increasing the security status score when the comparison indicates that the endpoint has received data from at least one of the one or more trusted security product vendors;
generating a ranked list of endpoints of the plurality of endpoints based on respective security status scores;
displaying, in a user interface, the ranked list of endpoints;
receiving, from a user via the user interface, a selection of a disposition for one or more selected endpoints from the ranked list of endpoints based on the security status score; and
performing, by a server or a threat management facility, the selected disposition.

* * * * *